E. KLEIN.
APPARATUS FOR THE CONCENTRATION OF VINEGAR AND ACETIC ACID.
APPLICATION FILED MAY 24, 1916.

1,291,025.

Patented Jan. 14, 1919.
2 SHEETS—SHEET 1.

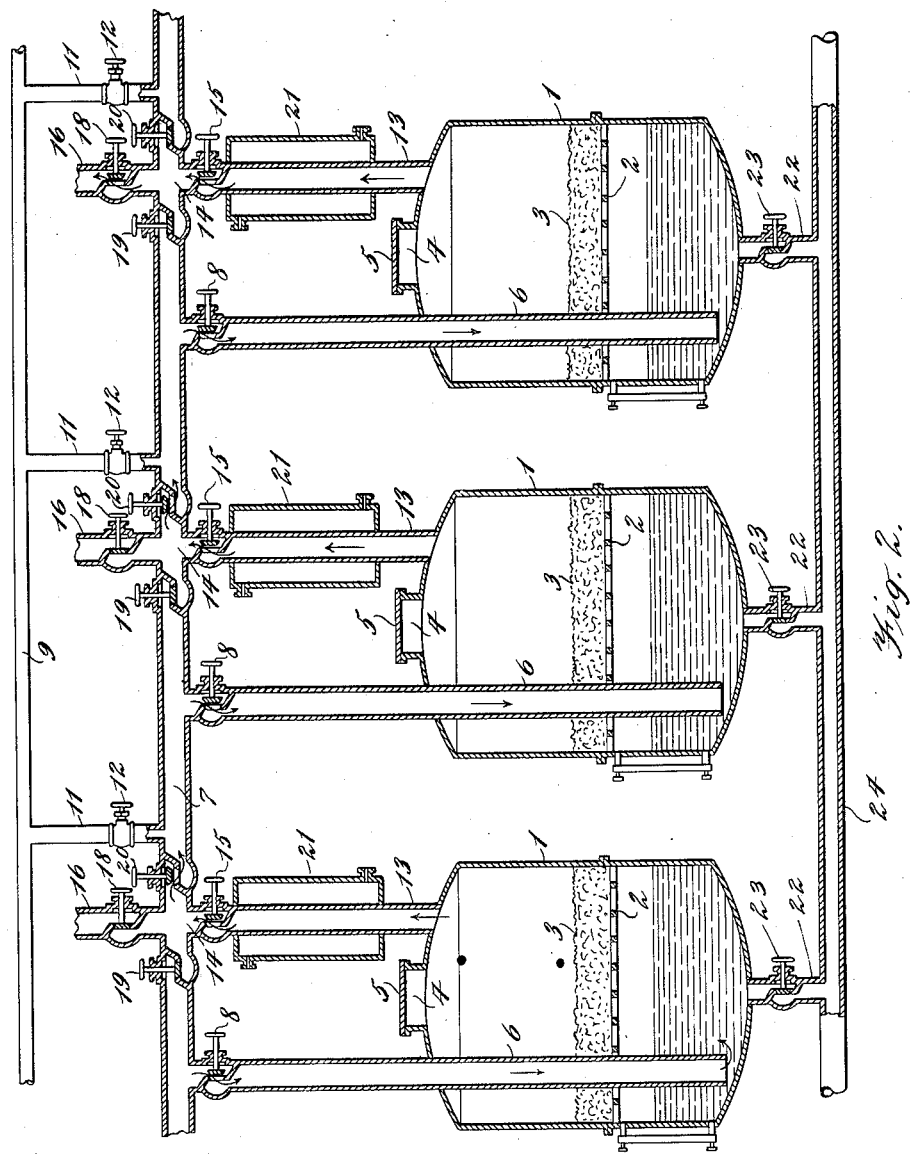

UNITED STATES PATENT OFFICE.

ERWIN KLEIN, OF PEEKSKILL, NEW YORK, ASSIGNOR TO THE FLEISCHMANN COMPANY, OF CINCINNATI, OHIO, A CORPORATION OF OHIO.

APPARATUS FOR THE CONCENTRATION OF VINEGAR AND ACETIC ACID.

1,291,025.

Specification of Letters Patent.

Patented Jan. 14, 1919.

Application filed May 24, 1916. Serial No. 99,524.

*To all whom it may concern:*

Be it known that I, ERWIN KLEIN, a subject of the King of Hungary, residing at Peekskill, in the county of Westchester and State of New York, have invented certain new and useful Improvements in Apparatus for the Concentration of Vinegar and Acetic Acid, of which the following is a specification.

My invention is a new and useful apparatus to be used for carrying out a process for the concentration of vinegar and acetic acid wherein the vinegar or acetic acid is dehydrated by treating the same with a water-binding or eliminating substance so that the water may be removed and all the essential components of the vinegar or acetic acid may, without undergoing any chemical alteration or change, be concentrated to any desired degree, said process being the invention of Dr. Alois Zeckendorf and Martin Nilsson, for which they have filed application for Letters Patent of the United States under date of March 28, 1916, Serial No. 87150.

The invention consists in the construction and combination of parts to be more fully described hereinafter and the novelty of which will be particularly pointed out and distinctly claimed. I have fully and clearly illustrated one embodiment of my invention in the accompanying drawings to be taken as a part of this specification, and wherein:

Fig. 2 is a view in side elevation, partially diagrammatic, and in section, showing the interior arrangement of the apparatus and the course of the materials during the practice of the process.

Figure 1:
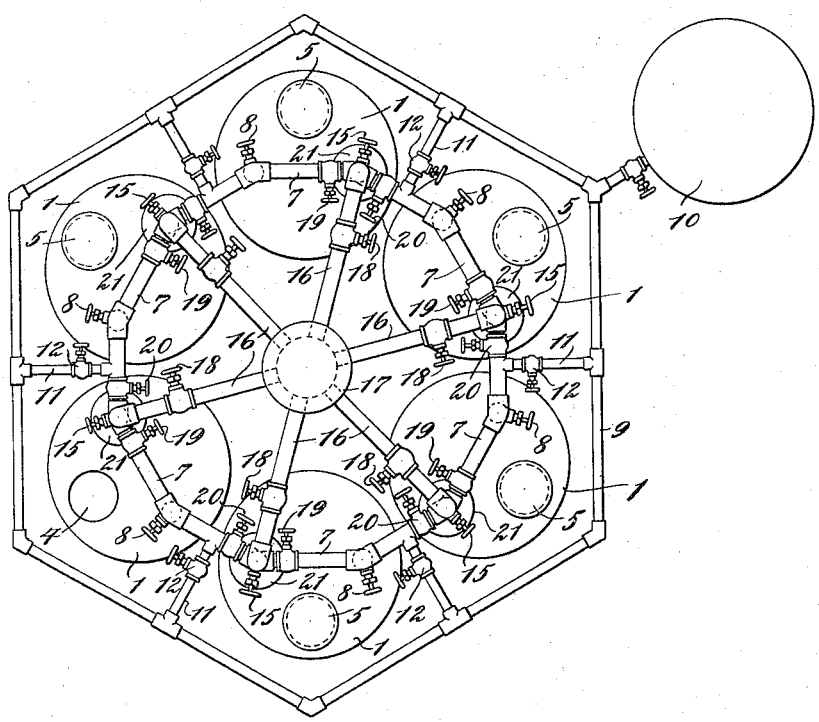
Figure 1 is a plan view of the apparatus.

Referring to the drawings by characters of reference, 1 designates each of a series of receptacles, vessels, or chambers preferably arranged in circular series around a central point, and which may be designated as dehydrators. Each of the vessels or chambers is provided at a point intermediate its upper and lower ends with an open shelf or grid 2 adapted to receive and support the water binding substance shown at 3, which may be, for example, calcium chlorid. It will be understood that the capacity of these receptacles is such as may be desired, or may be required by the extent of the operations to be carried out, and the quantity of material to be treated. Each vessel is provided at its upper end with a manhole 4, closed by a suitable cap 5 in order that access may be had to the interior of the vessel for any desired purpose.

Entering the top of each vessel and terminating adjacent the lower portion thereof at a point below the grid 2 is an inlet or feed-pipe 6, which pipes connect at the upper ends thereof to a continuous, circular vapor line 7 arranged above the said vessels, as shown in Fig. 2 of the drawings. The flow between the vapor line or pipe 7, and the pipes 6 is, in each instance, controlled by a hand valve 8, whereby any one of the vessels 1 may be placed in communication with, or isolated from, the vapor line by way of the pipes 6. Preferably arranged above the vapor line 7 is a feed or supply-pipe 9 which is connected at one end to a receptacle 10 adapted to contain the vinegar or acetic acid to be treated, or a mixture of the same with a water binding substance. This supply-pipe 9 is connected by a series of branch pipes 11, controlled by valves 12, with the said pipe 7, the point of connection of each branch pipe being between adjacent receptacles 1, respectively, as shown in Fig. 2. By this arrangement, the vinegar or acetic acid, or the mixture thereof with the water binding material, may be fed to any one or all of the said receptacles. Connected to the upper portion of each of the dehydrating vessels 1 is an outflow pipe 13, the upper end of which opens into the said vapor line 7, as shown at 14. Each of these pipes 13 is controlled by a hand valve 15 by means of which communication is established or cut off between the dehydrator receptacles or vessels, and the said pipe 7.

At points opposite or adjacent to each of the connections 14 the vapor line or pipe 7 is connected by a pipe 16 to a condenser 17, preferably arranged concentrically of the series of tanks, as shown in Fig. 1 of the drawings. Each pipe 16 is provided with a hand valve 18 for controlling flow therethrough. The vapor line 7 at points between the pipes 6 and the pipes 13, is provided with controlling valves 19, and between pipes 13 and the pipes 11 with controlling valves 20. By this arrangement the vapors flowing from a vessel or chamber 1, as will be hereinafter described, may be caused to flow to the condenser 17 through the pipe 16, as shown at the right hand of Fig. 1, or may be caused to flow into the vapor line 7 and thence be directed to and through another dehydrating vessel or chamber 1, as shown at the left and center of Fig. 2. We preferably provide each of the outlet-pipes 13 with a jacket 21, to receive a current of cooling liquid to provide a reflux condenser in order to assist in condensing the vapors flowing through the pipes 13, and provide for the proper and complete condensation and concentration of the material, in case it is desired that all the vapors be returned back into the still.

The receptacles or chambers 1 are provided with drain-pipes 22, by means of which the contents of the chambers may be drained off, said pipes 22 having valves 23, and being connected to a common drain-pipe 24.

By the construction and arrangement above described it will be apparent that any one, or all, or any intermediate number of these dehydrating tanks may be employed, either to treat the material and discharge it directly into the central condenser 17, or to discharge the vapors from one tank to the other in order to obtain the desired degree of concentration.

The operation of the above-described apparatus is as follows:

A mixture of the vinegar or acetic acid with the water binding material, for instance, calcium chlorid, may be made or placed in the feed or supply tank 10, and from there fed in any suitable manner, as by gravity, to the pipe 9. The pipe 9 being charged, any one or more of the tanks or chambers 1 may be fed with the mixture by opening the controlling valves 12, so that the mixture flows into the pipe 7 and through any one or more of the pipes 6 into the bottom portion of the dehydrating tanks or chambers. By way of example, the mixture may be fed into the chamber 1, shown at the left hand of Fig. 2. This mixture of the vinegar or acetic acid with the water binding substance will result in the removal of at least a portion of the water, which will be taken up by said substance.

By heating the vessels or chambers 1 in any suitable manner, not shown, until the acetic acid or vinegar is evaporated, the vapors formed flow up through the grid and the body of calcium chlorid 3 so that by contact a further quantity of water is withdrawn by the water binding substance, and the vapors of the acetic acid pass up through the pipe 13 into the vapor line 7. During this operation it will be understood that the valve 19 is closed. The main part of the dehydration is effected by the mixing before heating by the action of the water binding substance, the result being that instead of driving off the water, which, under ordinary conditions, would have the lower boiling point, it is kept back by its combination with the water binding substance, and the vapors richer in acetic acid are distilled. If it is desired that the vapors pass to the central condenser 17, the valve 20 is also closed and the valve 18 opened so that the vapors find access to the pipe 16. If it is desired to further concentrate the vinegar beyond the concentration performed in the first tank 1, the valve 18 is closed and the valve 20 opened so that the vapors flow into the pipe 7 and then down through the pipe 6 leading into the next dehydrating vessel, where they may pass through the body of the mixture of the vinegar or acetic acid, if any be present, in the bottom portion of the vessel, and by the distillation action the vapor is again driven up through the body of the calcium chlorid in the second tank. If no mixture be present in the second tank, then the vapors pass up through the body of material 3, to be further dehydrated. These vapors then pass up through the outlet pipe 13 and may be directed through the pipe 16 to the central condenser, or, if further concentration is desired, directed into the next following tank in the manner just described. By thus treating the vinegar or acetic acid to successive charges or bodies of the water binding material it is to produce any desired degree of concentration. This sequence of subjecting to different charges may continue throughout the whole series of tanks, if desired, the vapor from the final tank being directed through the pipe 16 from that tank into the central condenser 17. During this operation a portion of the water is removed from the vinegar or acetic acid by mixing the same with the water binding material, in the tank 10, as above stated, the water binding material carrying part of the water being physically mixed with the vinegar or acetic acid. When this mixture is distilled in the dehydrating vessels, the vinegar or acetic acid deprived of part of its water is vaporized and passes up through the overlying body 3 of water binding material, so that the latter absorbs a further quantity of water and the concentrated vinegar or acetic acid vapors on to the outlet pipe in a greater state of concentration.

In the operation described the vinegar or acetic acid is treated both by direct contact in a fluid state with the water binding substance, by reason of the mixture, and also by direct contact thereof in the state of vapor with the water binding substance in the dehydrating tank.

By this operation a high degree of concentration is obtained. It is also possible to carry on the operation without preliminary mixture of the water binding substance therewith, in which case the vinegar or acetic acid may be distilled in the dehydrating chamber or tank so that the vapors pass up through the water binding substance, whereby the water, or a portion thereof, is removed from the vapor, and the concentrated vinegar or acetic acid vapors are permitted to pass on out of the chamber to the next chamber, or to the condenser 15. The distillation may be carried on in the first dehydrating tank, or that one which is initially charged, until the temperature, and samples taken from the bottom by means of a test or try-cock show that practically all the acid has been removed from the charge, whereupon this tank may be cut out or eliminated from the series by proper manipulation of the valves and the charge renewed or replenished. The next tank in the series can then be used as the starting tank, and an additional portion of the water binding substance and vinegar or acetic acid admitted.

When the operation is carried out by pouring or filtering the vinegar or acetic acid through the body of the water binding material, the vinegar or acetic acid may be poured into the dehydrating tank through the manhole 4, and then the evaporation carried on as above described. It will be understood that a vacuum may be employed during the dehydration in order to facilitate the operation.

What I claim and desire to secure by Letters Patent of the United States is:—

1. An apparatus adapted for the concentration of vinegar and acetic acid comprising a chamber, a feed-pipe for the chamber, an outlet-pipe from the chamber, a pipe communicating with the feed-pipe and the outlet-pipe, a valve in the said pipe between the feed-pipe and the outlet-pipe, a condenser, and a pipe connecting the said pipe communicating with the feed-pipe and the outlet-pipe to the condenser.

2. An apparatus adapted for the concentration of vinegar and acetic acid comprising a chamber, a feed-pipe for the chamber, an outlet-pipe from the chamber, a pipe communicating with the feed-pipe and the outlet-pipe, a valve in the said pipe between the feed-pipe and the outlet-pipe, a condenser, a pipe connecting the said pipe communicating with the feed-pipe and the outlet-pipe to the condenser, and a supply pipe connected to said first-named pipe on the opposite side of the feed-pipe from said valve.

3. An apparatus adapted for the concentration of vinegar and acetic acid comprising a plurality of chambers, feed-pipes for said chambers, outlet-pipes for said chambers, a pipe to which said feed-pipes and outlet-pipes are connected, a condenser, connections between each outlet-pipe and the condenser, and valve means for causing the flow from each outlet-pipe to pass to the condenser or to one of said feed-pipes.

4. An apparatus adapted for the concentration of vinegar and acetic acid comprising a plurality of chambers, feed pipes for said chambers, outlet-pipes for said chambers, a pipe to which said feed-pipes and outlet-pipes are connected, a condenser, connections between each outlet-pipe and the condenser, and valve means for causing the flow from each outlet-pipe to pass to the condenser or to one of said feed-pipes, and supply-pipes connected to said first-named pipe between the feed-pipes and the outlet-pipes.

5. An apparatus adapted for the concentration of vinegar and acetic acid comprising a plurality of chambers, a pipe, feed-pipes connecting said pipe with said chambers, outlet pipes connecting the chambers with the first-named pipe, a valve in said pipe between the feed-pipe and the outlet-pipe of each chamber, a valve in said pipe between the outlet-pipe of each chamber and the feed-pipe of the next adjacent chamber, a condenser, a pipe connected to the condenser and to said first-named pipe between said valves.

6. An apparatus adapted for the concentration of vinegar and acetic acid comprising a plurality of chambers, a pipe, feed-pipes connecting said pipe with said chamber, outlet-pipes connecting the chambers with the first-named pipe, a valve in said pipe between the feed-pipe and the outlet-pipe of each chamber, a valve in said pipe between the outlet pipe of each chamber and the feed-pipe of the next adjacent chamber, a condenser, a pipe connected to the condenser and to said first-named pipe between said valves, and a supply-pipe connected to said first-named pipe between each of said last-named valves and the feed-pipe of the next adjacent chamber.

7. An apparatus adapted for the concentration of vinegar and acetic acid comprising a chamber, a grid in the chamber, a feed-pipe for the chamber opening into the latter below the grid, an outlet-pipe from the chamber, a pipe communicating with the feed-pipe and the outlet-pipe, a valve in said communicating pipe between the feed-pipe and the outlet-pipe, a condenser and a pipe connecting the said pipe communicating with the feed-pipe and the outlet-pipe to the condenser.

In testimony whereof I have hereunto signed my name in the presence of two subscribing witnesses.

ERWIN KLEIN.

Witnesses:
C. G. HEYLMUN,
M. E. McNINCH.